(12) United States Patent
Rezayee et al.

(10) Patent No.: US 11,087,315 B2
(45) Date of Patent: Aug. 10, 2021

(54) SERVER-ASSISTED PAIRING FOR WIRELESS COMMUNICATIONS

(71) Applicant: Square, Inc., San Francisco, CA (US)

(72) Inventors: Afshin Rezayee, Richmond Hill (CA); Malcolm Smith, Toronto (CA); Sergei Mosends, Oakville (CA); Michael Wells White, San Francisco, CA (US); Ovidiu I Bota, Georgetown (CA); Max Guise, San Francisco, CA (US); Andrew John Leiserson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/864,423

(22) Filed: Sep. 24, 2015

(65) Prior Publication Data

US 2017/0091762 A1 Mar. 30, 2017

(51) Int. Cl.
*G06Q 20/38* (2012.01)
*G06Q 20/20* (2012.01)
(Continued)

(52) U.S. Cl.
CPC ....... *G06Q 20/3829* (2013.01); *G06Q 20/202* (2013.01); *G06Q 20/3278* (2013.01);
(Continued)

(58) Field of Classification Search
None
See application file for complete search history.

(56) References Cited

U.S. PATENT DOCUMENTS

| 3,128,349 | A |   | 4/1964 | Boesch et al. |
| 4,405,829 | A | * | 9/1983 | Rivest ............ H04L 9/302 380/255 |

(Continued)

FOREIGN PATENT DOCUMENTS

| AU | 2324402 A | 6/2002 |
| CA | 2 990 199 A1 | 1/2017 |

(Continued)

OTHER PUBLICATIONS

Du, Wei. A mobile signing solution based on Personal Transaction Protocol and J2ME. Diss. University of Ottawa (Canada), 2006.*

(Continued)

*Primary Examiner* — Neha Patel
*Assistant Examiner* — Gabriel Mercado
(74) *Attorney, Agent, or Firm* — Maynard Cooper & Gale, P.C.; Brian T. Sattizahn

(57) ABSTRACT

A wireless communication device such as a payment reader has a wireless communication interface and is able to establish wireless pairing with an interactive electronic device such as a merchant device running a point of sale application. In order to establish pairing, the wireless communication device accesses a passkey and encrypts the passkey. The encrypted passkey is transmitted to the interactive electronic device via the wireless communication interface, and the interactive electronic device sends the encrypted passkey to a pairing server. The pairing server decrypts the encrypted passkey and sends the decrypted passkey back to the interactive electronic device via a secure connection. The wireless communication device and the interactive electronic device establish wireless pairing based on the passkey and the decrypted passkey.

7 Claims, 7 Drawing Sheets

(51) Int. Cl.
*G06Q 20/32* (2012.01)
*G06Q 20/40* (2012.01)
*H04W 12/00* (2009.01)
*G06Q 20/34* (2012.01)
*H04L 12/28* (2006.01)
*H04W 84/18* (2009.01)

(52) U.S. Cl.
CPC ..... *G06Q 20/352* (2013.01); *G06Q 20/40975* (2013.01); *H04L 12/282* (2013.01); *H04W 12/003* (2019.01); *G06Q 2220/00* (2013.01); *H04W 84/18* (2013.01)

(56) References Cited

U.S. PATENT DOCUMENTS

| | | |
|---|---|---|
| 4,776,003 A | 10/1988 | Harris |
| 4,860,336 A | 8/1989 | D'Avello et al. |
| 5,221,838 A | 6/1993 | Gutman et al. |
| 5,241,161 A | 8/1993 | Zuta |
| 5,351,296 A | 9/1994 | Sullivan |
| 5,388,155 A | 2/1995 | Smith |
| 5,408,513 A | 4/1995 | Busch, Jr. et al. |
| 5,434,395 A | 7/1995 | Storck et al. |
| 5,714,741 A | 2/1998 | Pieterse et al. |
| 5,729,591 A | 3/1998 | Bailey |
| 5,740,232 A | 4/1998 | Pailles et al. |
| 5,789,733 A | 8/1998 | Jachimowicz et al. |
| 5,838,773 A | 11/1998 | Eisner et al. |
| 5,850,599 A | 12/1998 | Seiderman |
| 5,867,795 A | 2/1999 | Novis et al. |
| 5,940,510 A | 8/1999 | Curry et al. |
| 6,010,067 A | 1/2000 | Elbaum |
| 6,098,881 A | 8/2000 | Deland, Jr. et al. |
| 6,144,336 A | 11/2000 | Preston et al. |
| 6,234,389 B1 | 5/2001 | Valliani et al. |
| 6,278,779 B1 | 8/2001 | Bryant et al. |
| 6,327,578 B1* | 12/2001 | Linehan ................ G06Q 20/02 705/65 |
| 6,481,623 B1 | 11/2002 | Grant et al. |
| 6,886,742 B2 | 5/2005 | Stoutenburg et al. |
| 6,990,683 B2 | 1/2006 | Itabashi |
| 7,003,316 B1 | 2/2006 | Elias et al. |
| 7,040,534 B2 | 5/2006 | Turocy et al. |
| 7,066,382 B2 | 6/2006 | Kaplan |
| 7,083,090 B2 | 8/2006 | Zuili |
| 7,124,953 B2 | 10/2006 | Anttila et al. |
| 7,163,148 B2 | 1/2007 | Durbin et al. |
| 7,210,627 B2 | 5/2007 | Morley et al. |
| 7,424,732 B2 | 9/2008 | Matsumoto et al. |
| 7,433,452 B2 | 10/2008 | Taylor et al. |
| 7,591,425 B1 | 9/2009 | Zuili et al. |
| 7,673,799 B2 | 3/2010 | Hart et al. |
| 7,810,729 B2 | 10/2010 | Morley, Jr. |
| 7,865,430 B1 | 1/2011 | Kolls |
| 7,896,248 B2 | 3/2011 | Morley, Jr. |
| 8,086,531 B2 | 12/2011 | Litster et al. |
| 8,126,734 B2 | 2/2012 | Dicks et al. |
| 8,128,002 B2 | 3/2012 | McCallum et al. |
| 8,265,553 B2 | 9/2012 | Cheon et al. |
| 8,397,988 B1 | 3/2013 | Zuili |
| 8,768,838 B1* | 7/2014 | Hoffman ................ G06Q 40/00 705/44 |
| 8,983,873 B2 | 3/2015 | Lund |
| 9,020,853 B2 | 4/2015 | Hoffman et al. |
| 9,022,285 B2 | 5/2015 | Graylin |
| 9,022,291 B1 | 5/2015 | van der Merwe et al. |
| 9,022,292 B1 | 5/2015 | van der Merwe et al. |
| 9,047,599 B1 | 6/2015 | Lambert et al. |
| 9,128,703 B1 | 9/2015 | Lachwani et al. |
| 9,173,098 B1* | 10/2015 | Ran ...................... H04W 12/06 |
| 9,286,500 B1 | 3/2016 | Post et al. |
| 9,312,949 B1 | 4/2016 | Templeton et al. |
| 9,443,118 B1 | 9/2016 | Templeton et al. |
| 9,489,670 B2 | 11/2016 | McGill |
| 9,530,032 B2 | 12/2016 | Post et al. |
| 9,633,350 B2 | 4/2017 | Post et al. |
| 9,679,286 B2 | 6/2017 | Colnot et al. |
| 9,911,118 B2 | 3/2018 | Carlson |
| 10,068,550 B1 | 9/2018 | Chen |
| 10,120,427 B1 | 11/2018 | Hebner et al. |
| 2001/0015377 A1 | 8/2001 | Vassura et al. |
| 2001/0021980 A1 | 9/2001 | Linden et al. |
| 2002/0091633 A1 | 7/2002 | Proctor |
| 2002/0153414 A1 | 10/2002 | Stoutenburg et al. |
| 2003/0135418 A1 | 7/2003 | Shekhar et al. |
| 2003/0154414 A1 | 8/2003 | von Mueller et al. |
| 2003/0183691 A1 | 10/2003 | Lahteenmaki et al. |
| 2004/0012875 A1 | 1/2004 | Wood |
| 2004/0041911 A1 | 3/2004 | Odagiri et al. |
| 2004/0059682 A1 | 3/2004 | Hasumi et al. |
| 2004/0099746 A1 | 5/2004 | Norton |
| 2004/0167820 A1 | 8/2004 | Melick et al. |
| 2004/0204082 A1 | 10/2004 | Abeyta |
| 2005/0097015 A1 | 5/2005 | Wilkes et al. |
| 2005/0109841 A1 | 5/2005 | Ryan et al. |
| 2005/0236480 A1 | 10/2005 | Vrotsos et al. |
| 2005/0243059 A1 | 11/2005 | Morris et al. |
| 2005/0247787 A1 | 11/2005 | Von Mueller et al. |
| 2006/0032905 A1 | 2/2006 | Bear et al. |
| 2006/0049255 A1 | 3/2006 | von Mueller et al. |
| 2006/0135204 A1 | 6/2006 | Angelhag |
| 2006/0219776 A1 | 10/2006 | Finn |
| 2006/0223580 A1 | 10/2006 | Antonio et al. |
| 2007/0022058 A1* | 1/2007 | Labrou ................ G06Q 20/32 705/67 |
| 2007/0067833 A1 | 3/2007 | Colnot |
| 2007/0070035 A1 | 3/2007 | Asbury et al. |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2007/0251997 A1 | 11/2007 | Brown et al. |
| 2008/0014984 A1 | 1/2008 | Brown et al. |
| 2008/0017704 A1 | 1/2008 | VanDeburg et al. |
| 2008/0091617 A1 | 4/2008 | Hazel et al. |
| 2008/0113618 A1 | 5/2008 | De Leon et al. |
| 2009/0033513 A1 | 2/2009 | Salsbury et al. |
| 2009/0067846 A1 | 3/2009 | Yu et al. |
| 2009/0070583 A1 | 3/2009 | von Mueller et al. |
| 2009/0112768 A1 | 4/2009 | Hammad et al. |
| 2009/0164326 A1 | 6/2009 | Bishop et al. |
| 2009/0188977 A1 | 7/2009 | Adams et al. |
| 2009/0195402 A1 | 8/2009 | Izadi et al. |
| 2009/0282261 A1 | 11/2009 | Khan et al. |
| 2010/0012715 A1* | 1/2010 | Williams ................ G06Q 20/32 235/375 |
| 2010/0057620 A1 | 3/2010 | Li et al. |
| 2010/0087144 A1 | 4/2010 | Korenshtein |
| 2010/0138666 A1 | 6/2010 | Adams et al. |
| 2010/0235621 A1 | 9/2010 | Winkler et al. |
| 2010/0243732 A1 | 9/2010 | Wallner |
| 2010/0257101 A1* | 10/2010 | Fierro .................... G06Q 20/12 705/64 |
| 2010/0304819 A1 | 12/2010 | Stockdale et al. |
| 2011/0070834 A1 | 3/2011 | Griffin et al. |
| 2011/0159959 A1 | 6/2011 | Mallinson et al. |
| 2012/0126011 A1 | 5/2012 | Lamba et al. |
| 2012/0254622 A1 | 10/2012 | Kanungo |
| 2012/0324501 A1* | 12/2012 | Klein .................. H04N 21/4784 725/23 |
| 2013/0030931 A1 | 1/2013 | Moshfeghi |
| 2013/0084801 A1 | 4/2013 | Royston et al. |
| 2013/0096701 A1 | 4/2013 | Suorajaervi et al. |
| 2013/0124346 A1* | 5/2013 | Baldwin ................ G06Q 20/322 705/16 |
| 2013/0182845 A1* | 7/2013 | Monica ................ H04L 63/0869 380/270 |
| 2013/0198516 A1 | 8/2013 | Fenton et al. |
| 2013/0328801 A1 | 12/2013 | Quigley et al. |
| 2014/0001263 A1 | 1/2014 | Babu et al. |
| 2014/0001264 A1 | 1/2014 | Babu et al. |
| 2014/0016945 A1 | 1/2014 | Pan |
| 2014/0025517 A1 | 1/2014 | Argue et al. |

(56) References Cited

U.S. PATENT DOCUMENTS

| | | | |
|---|---|---|---|
| 2014/0122884 A1* | 5/2014 | Pieczul | H04L 9/3215 713/171 |
| 2014/0316560 A1 | 10/2014 | Hoormann et al. | |
| 2014/0325220 A1 | 10/2014 | Tunnell et al. | |
| 2014/0372320 A1 | 12/2014 | Goldfarb et al. | |
| 2015/0133047 A1 | 5/2015 | Smith et al. | |
| 2015/0234525 A1 | 8/2015 | Yisraelian | |
| 2015/0278506 A1 | 10/2015 | Jun et al. | |
| 2015/0287030 A1* | 10/2015 | Sagady | G06Q 20/3829 705/71 |
| 2015/0334351 A1* | 11/2015 | Cocchi | H04N 7/1675 380/228 |
| 2015/0347738 A1 | 12/2015 | Ulrich et al. | |
| 2015/0348009 A1 | 12/2015 | Brown et al. | |
| 2016/0007290 A1 | 1/2016 | Lindemann et al. | |
| 2016/0019512 A1 | 1/2016 | Buchheim et al. | |
| 2016/0088711 A1 | 3/2016 | Ng et al. | |
| 2016/0098711 A1 | 4/2016 | Patel et al. | |
| 2016/0112825 A1* | 4/2016 | Miller | H04W 12/04 455/41.2 |
| 2016/0134709 A1* | 5/2016 | Savolainen | H04L 67/16 370/338 |
| 2016/0275478 A1 | 9/2016 | Li et al. | |
| 2016/0307189 A1 | 10/2016 | Zarakas et al. | |
| 2017/0004475 A1 | 1/2017 | White et al. | |
| 2017/0091732 A1 | 3/2017 | Rezayee et al. | |
| 2017/0109743 A1 | 4/2017 | Zarakas et al. | |
| 2017/0325161 A1* | 11/2017 | Kwon | H04W 76/10 |

FOREIGN PATENT DOCUMENTS

| | | |
|---|---|---|
| DE | 20320080 U1 | 4/2004 |
| EP | 0 895 203 A2 | 2/1999 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2017/004070 A1 | 1/2017 |
| WO | 2017/053736 A1 | 3/2017 |

OTHER PUBLICATIONS

Adams C. (2011, p. 762) Master Key. In: van Tilborg H.C.A., ajodia S. (eds) Encyclopedia of Cryptography and Security. Springer, Boston, (Year: 2011).*

International Search Report and Written Opinion for International Application No. PCT/US2016/053354, dated Nov. 16, 2016.

Tobias H. "Flashlight: Optical Communication between Mobile Phones and Interactive Tabletops," Saarbrucken, Germany,ITS 2010: Interactions, Nov. 7-10, 2010, pp. 135-138.

Zoltan, M.B., "How Do I Pair My Phone to a Bluetooth Device?," TechHive, Published on Nov. 1, 2010, Retrieved from the Internet URL: http://www.techhive.com/article/209431/pair_phone_with_bluetooth_device.html, on Nov. 10, 2014, pp. 1-3.

Non-Final Office Action dated Oct. 2, 2014, for U.S. Appl. No. 13/841,689, of Post, D.J., et al., filed Mar. 15, 2013.

Non-Final Office Action dated Apr. 20, 2015, for U.S. Appl. No. 13/841,689, of Post, D.J., et al., filed Mar. 15, 2013.

Final Office Action dated Oct. 1, 2015, for U.S. Appl. No. 13/841,689, of Post, D.J., et al., filed Mar. 15, 2013.

Non-Final Office Action dated Nov. 5, 2015, for U.S. Appl. No. 13/786,373, of Templeton, T., et al., filed Mar. 5, 2013.

Notice of Allowance dated Nov. 6, 2015, for U.S. Appl. No. 13/841,689, of Post, D.J., et al., filed Mar. 15, 2013.

Notice of Allowance dated Dec. 22, 2015, for U.S. Appl. No. 13/786,373, of Templeton, T., et al., filed Mar. 5, 2013.

Notice of Allowance dated Feb. 12, 2016, for U.S. Appl. No. 13/841,689, of Post, D.J., et al., filed Mar. 15, 2013.

Non-Final Office Action dated Apr. 21, 2016, for U.S. Appl. No. 14/966,985, of Post, D.J., et al., filed Dec. 11, 2015.

Notice of Allowance dated May 18, 2016, for U.S. Appl. No. 15/056,961, of Templeton, T., et al., filed Feb. 29, 2016.

Non-Final Office Action dated Jun. 27, 2016, for U.S. Appl. No. 14/709,394, of Chen, G.H., filed May 11, 2015.

Notice of Allowance dated Aug. 15, 2016, for U.S. Appl. No. 14/966,985, of Post, D.J., et al., filed Dec. 11, 2015.

Notice of Allowance dated Nov. 17, 2016, for U.S. Appl. No. 14/966,985, of Post, D.J., et al., filed Dec. 11, 2015.

Notice of Allowance dated Dec. 29, 2016, for U.S. Appl. No. 14/709,394, of Chen, G.H., filed May 11, 2015.

Notice of Allowance dated Jan. 9, 2017, for U.S. Appl. No. 15/355,709 , of Post, D. J., et al., filed Nov. 18, 2016.

Non-Final Office Action dated Jan. 12, 2018, for U.S. Appl. No. 15/086,002, of Hebner, N., et al., filed Mar. 30, 2016.

Notice of Allowance dated May 1, 2018, for U.S. Appl. No. 15/471,062, of Chen, G.H., filed Mar. 28, 2017.

Notice of Allowance dated Jul. 3, 2018, for U.S. Appl. No. 15/086,002, of Hebner, N., et al., filed Mar. 30, 2016.

Examiner Requisition for Canadian Patent Application No. 2,990,199, dated Sep. 17, 2018.

International Search Report and Written Opinion for International Patent Application No. PCT/US2016/039872, dated Nov. 29, 2016.

Supplementary European Search Report for European Patent Application No. 16818610.4, dated Oct. 26, 2018.

Non-Final Office Action dated Feb. 26, 2019, for U.S. Appl. No. 14/855,130, of White, M. W., et al., filed Sep. 15, 2015.

Non-Final Office Action dated Apr. 19, 2019, for U.S. Appl. No. 14/864,547, of Rezayee, A. et al., filed Sep. 24, 2015.

Decision to Grant for European Patent Application No. 16775952.1, dated Apr. 26, 2019.

Non-Final Office Action dated May 2, 2019, for U.S. Appl. No. 15/199,388, of Han, K. et al., filed 30, 2016.

(56) References Cited

OTHER PUBLICATIONS

"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.

"Embedded FINancial transactional IC card READer," Retrieved from the URL: https://cordis.europa.eu/project/rcn/58338/factsheet/en.

Seethapriya Venkataramani and Srividya Gopalan., "Mobile phone based RFID architecture for secure electronic payments using RFID credit cards," 2007 IEEE, (ARES'07).

"Guideline for the Use of Advanced Authentication Technology," FIPS 190, Sep. 28, 1994.

"Identification cards—Recording technique—Part 4—Location of read-only magnetic tracks—Track 1 and 2," ISO/IEC 7811-4:1995, International Organization for Standardization, Aug. 1995.

Jerome Svigals., "The Long Life and Imminent Death of the Mag-stripe Card," IEEE Spectrum, vol. 49, Issue 61, Jun. 2012.

"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing—rev1.pdf Apr. 14, 2008.

Martha E. Haykin et al., "Smart Card Technology: New Methods for Computer Access Control," NIST Special Publication 500-157, Sep. 1988.

"MSP430x1xx Family User's Guide," (including 2016 correction sheet at 2), Texas Instruments Inc., 2006.

Spegele, Joseph Brain., "A Framework for Evaluating Application of Smart Cards and Related Technology Within the Department of Defense," Naval Postgraduate School, Jan. 1995.

Stephen A. Sherman et al., "Secure Network Access Using Multiple Applications of AT&T's Smart Card," AT&T Technical Journal, Sep./Oct. 1994.

Examiner Requisition for Canadian Patent Application No. 2,990,199, dated Aug. 8, 2019.

Examination Report for European Patent Application No. 16818610.4, dated Nov. 26, 2019.

Final Office Action dated Sep. 18, 2019, for U.S. Appl. No. 14/855,130, of White, M.W., et al., filed Sep. 15, 2015.

Final Office Action dated Oct. 17, 2019, for U.S. Appl. No. 14/864,547, of Rezayee, A., et al., filed Sep. 24, 2015.

Final Office Action dated Nov. 21, 2019, for U.S. Appl. No. 15/199,388, of Han, K., et al., filed Jun. 30, 2016.

Advisory Action dated Jan. 17, 2020, for U.S. Appl. No. 14/864,547, of Rezayee, A., et al., filed Sep. 24, 2015.

Advisory Action dated Feb. 6, 2020, for U.S. Appl. No. 15/199,388, of Han, K., et al., filed Jun. 30, 2016.

Non-Final Office Action dated May 15, 2020, for U.S. Appl. No. 15/199,388, of Han, K., et al., filed Jun. 30, 2016.

Non-Final Office Action dated Jul. 24, 2020, for U.S. Appl. No. 14/855,130, of White, M.W., et al., filed Sep. 15, 2015.

Non-Final Office Action dated Oct. 21, 2020, for U.S. Appl. No. 14/864,547, of Rezayee, A., et al., filed Sep. 24, 2015.

* cited by examiner

SERVER-ASSISTED PAIRING FOR WIRELESS COMMUNICATIONS

BACKGROUND

Electronic devices exchange information in a variety of ways, such as by physical transfer of data on memory devices, wired communications, and wireless communications. With a wired connection or memory device the data that is being transferred between devices is limited to a physical communication path or exchange of a device. Thus, a third party may have difficulty gaining access to the data without gaining actual physical access to the communication path or the device. Wireless communications allow electronic devices to exchange information without the need for the devices to be physically connected or for the exchange of a disk or other memory device. Because wireless signals are not limited to a particular physical medium it is possible for those signals to be intercepted by a third party. Thus, wireless communications are often encrypted.

In some implementations, this encryption is performed by two wireless communication devices that are paired together. Once they are paired, the wireless communication devices have keys or other information that allows each paired wireless communication device to encrypt data before transmission and to decrypt data that is received from the other paired device. Even if a third party is able to intercept wireless communications between the paired devices, decrypting the underlying data is not possible or is extremely difficult. In this manner, the paired devices are able to securely communicate with each other wirelessly.

In order to be paired the wireless communication devices undergo a pairing process. During this pairing process the wireless communication devices exchange information that allows the paired communications to be encrypted. However, these communications are not sent over an encrypted channel and thus can be intercepted by a third party. Thus, some pairing processes require an initial exchange of information such as a passkey. For example, a passkey may be displayed on a first wireless communication device. A user can observe the passkey on the display of the first wireless communication device and enter the passkey at a user interface of a second wireless communication device.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
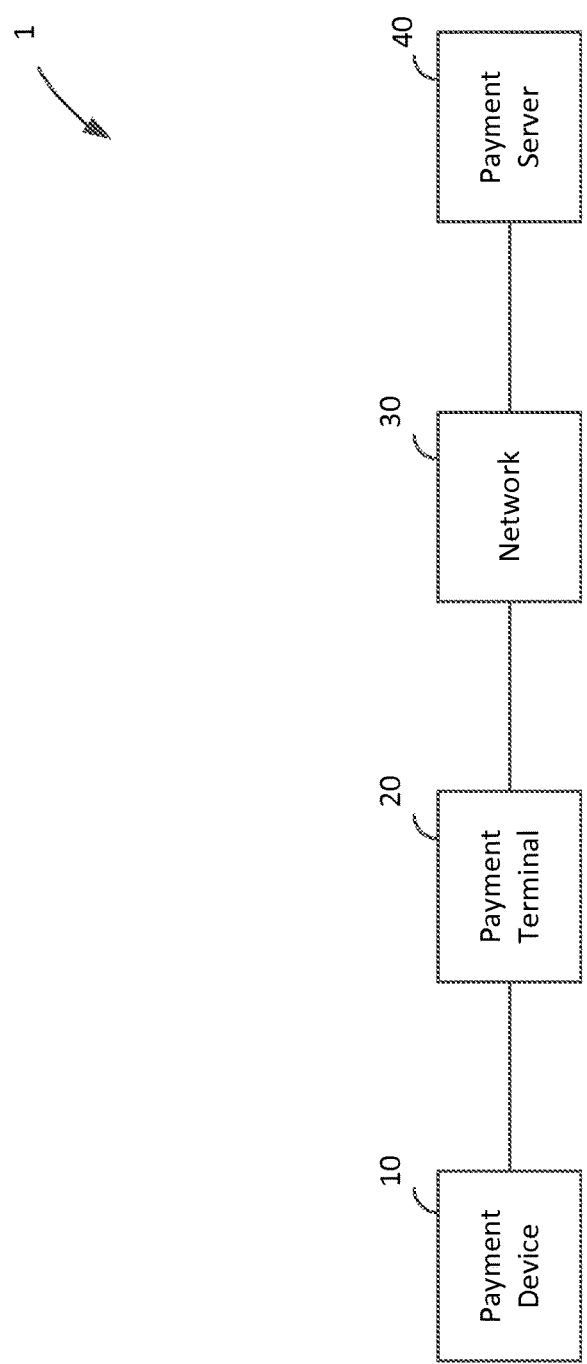
FIG. 1 shows an illustrative block diagram of a payment system in accordance with some embodiments of the present disclosure.

A payment system may include a payment reader that interacts with payment devices such as credit cards and near field communication (NFC) payment applications running on mobile devices, a merchant device operating a point-of-sale application, and a payment service system that processes payment transactions with financial institutions such as issuer banks. The components of the payment system—including the payment reader, the point-of-sale application, and the payment service system—may cooperate such that these components are able to process the payment transactions.

In some implementations, the payment reader may be a relatively small battery-powered wireless communication device that lacks a user interface such as a touch screen or a keyboard. The merchant device may be an interactive electronic device such as a smart phone or tablet that runs the point-of-sale application, and may communicate with the payment reader using a wireless communication protocol such as Bluetooth. It may be necessary for the payment reader and the merchant device to undergo a pairing procedure so that critical payment and transaction information may be protected by encryption.

One such pairing procedure involves a passkey such as a 6-digit passkey. In one embodiment, the passkey is generated by the payment reader. The payment reader then encrypts the passkey with a secret key that is shared with the payment service system, which may function as a pairing server. The encrypted passkey is broadcast within an advertising message to all devices that are listening for advertising messages. Although the advertising message is not itself encrypted, the underlying passkey is encrypted. In some embodiments, a unique identifier for the payment reader may be transmitted in the advertising message. This unique identifier may be transmitted with the encrypted passkey, or in some embodiments, instead of the encrypted passkey. The pairing server may know the unique identifier for the payment reader and may associate the unique identifier with the shared key or with a known passkey.

The point-of-sale application of the merchant device may receive an input from a user seeking to establish a Bluetooth connection with the payment reader. The merchant device then receives the advertising message and the encrypted passkey and/or identifier is forwarded to the pairing server. The pairing server retrieves or decrypts the passkey and transmits it back to the merchant device over a secure connection such as TLS, SSL, or as encrypted data based on keys of the merchant device and pairing server. The merchant device receives the retrieved or decrypted passkey, and the merchant device and payment reader complete a pairing procedure to establish the Bluetooth connection based on the payment reader's passkey and the received passkey. Once the devices are paired, the payment system can process payment transactions, with the payment reader and merchant device exchanging information over an encrypted connection.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 is depicted as a single simplified block, it will be understood that payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
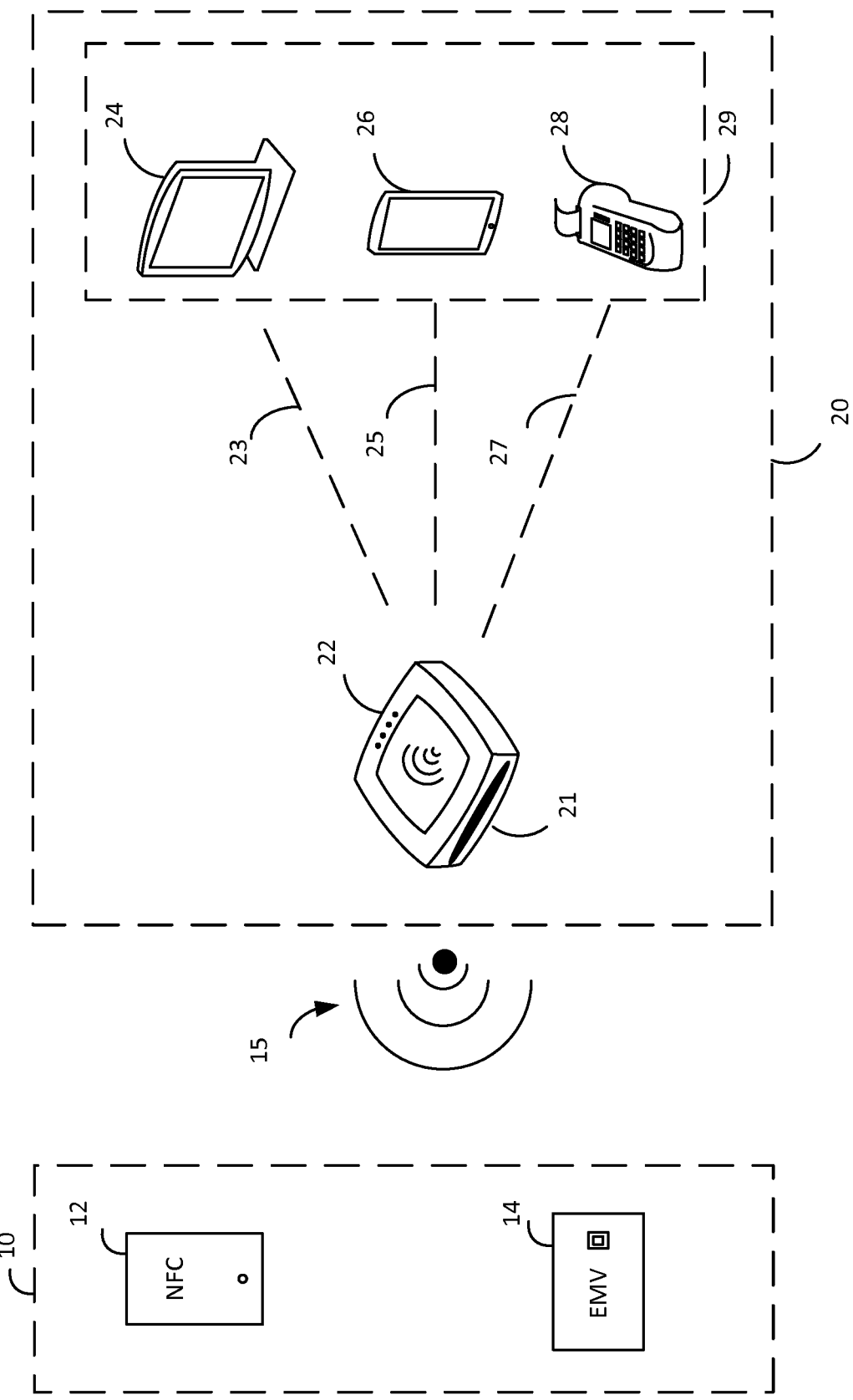
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. The payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment reader 22 may communicate with the merchant device 29 via a Bluetooth classic or Bluetooth low energy interface. In some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such as TLS or SSL.

Figure 3:
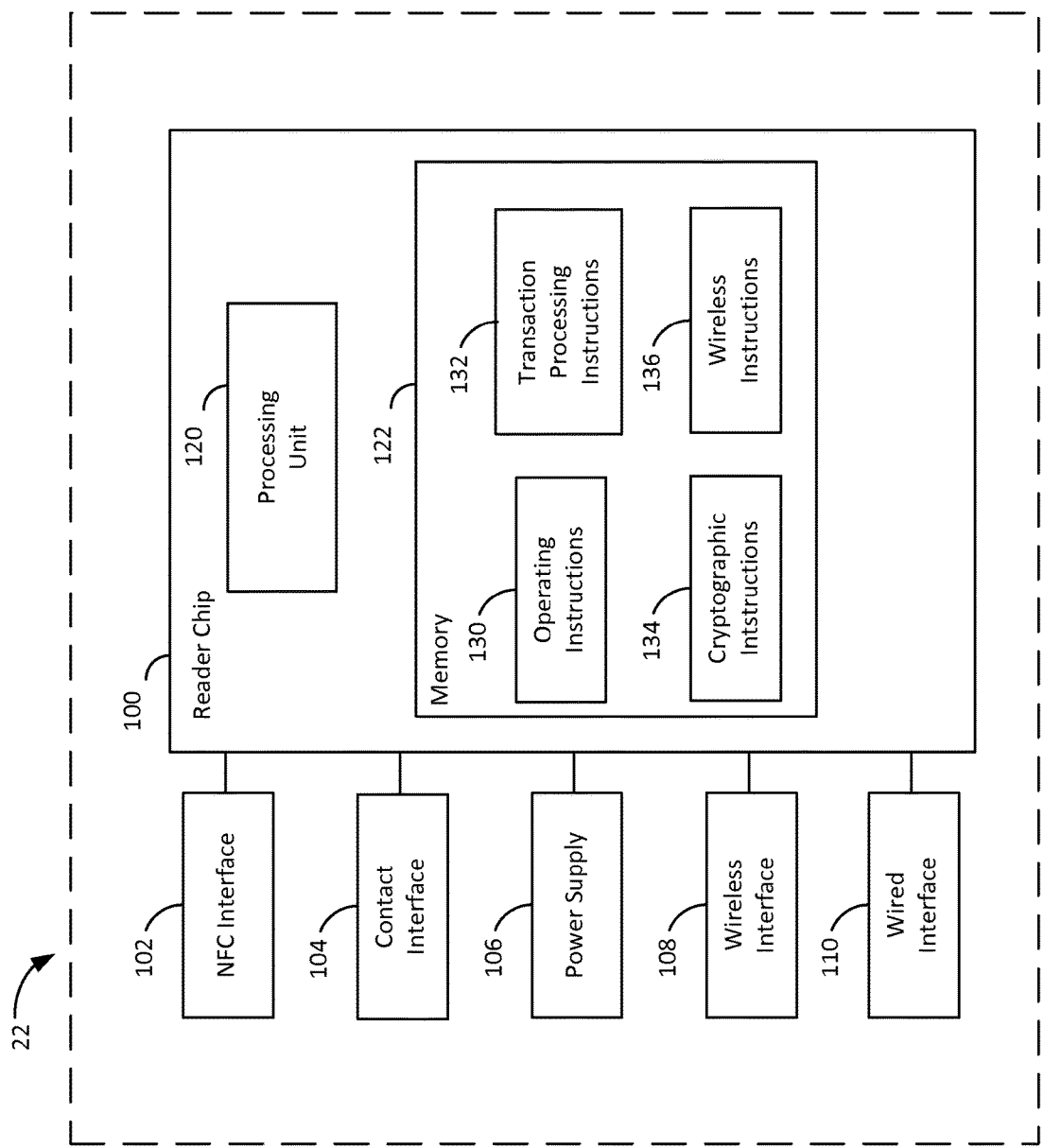
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using Bluetooth classic or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a reader chip 100, a NFC interface 102, a contact interface 104, a power supply 106, a wireless communication interface 108, and a wired interface 110. Payment reader also includes a processing unit 120 and memory 122. Although in one embodiment the processing unit 120 and memory 122 will be described as packaged in a reader chip 100 and configured in a particular manner, it will be understood that processing unit 120 and memory 122 may be configured in any suitable manner to perform the functionality of the payment reader 22 as is described herein.

Processing unit 120 of reader chip 100 of payment reader 22 may include any suitable hardware, software, memory, and circuitry as is necessary to perform and control the functions of payment reader 22. A processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

In an exemplary embodiment, the processing unit 120 of reader chip 100 may include two RISC processors configured to perform general processing and cryptographic processing functions based on instructions stored in memory 122, respectively. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, and security circuitry. In one embodiment, interface circuitry may include circuitry for interfacing with a wireless communication interface 108 (e.g., Wi-Fi, Bluetooth classic, and Bluetooth low energy), circuitry for interfacing with a wired interface 110 (e.g., USB, Ethernet, FireWire, and lightning), circuitry for interfacing with other communication interfaces or buses (e.g., I²C, SPI, UART, and GPIO), circuitry for interfacing with a power supply 106 (e.g., power management circuitry, power conversion circuitry, rectifiers, and battery charging circuitry), and circuitry for interfacing with a contact interface 104 (e.g., power and communication circuitry for directly interfacing with an EMV chip of a chip card 14 that is inserted in slot 21).

In one embodiment, analog front end circuitry of reader chip 100 includes circuitry for interfacing with the analog components of NFC interface 102 (e.g., electromagnetic compatibility (EMC) circuitry, matching circuits, modulation circuitry, and measurement circuitry). Security circuitry of reader chip 100 may include circuitry for protecting sensitive information such as encryption keys, merchant information, and customer information. In one embodiment, security circuitry may include tamper protection circuitry and electronic fuses for selectively cutting off power or disabling one or more components of reader chip 100 in response to attempts to obtain improper access to reader chip 100.

NFC interface 102 may provide for NFC communication with a contactless device such as NFC device 12 or chip card 14. Based on a signal provided by reader chip 100, an antenna of NFC interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the NFC interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins for physically interfacing with the chip card 14 according to EMV specifications. The EMV chip of the chip card 14 is provided with power and communicates with the processing unit 120 of the reader chip 100 via the contact pins. In this manner, the payment reader and the chip card are able to exchange information such as payment information.

Power supply 106 may include one or more power supplies such as a physical connection to AC power or a battery. Power supply 106 may include power conversion circuitry for converting AC power and generating a plurality of DC voltages for use by components of payment reader 22. When power supply 106 includes a battery, the battery may be charged via a physical power connection, via inductive charging, or via any other suitable method.

Wireless communication interface 108 may include hardware and software for communicating with external electronic devices using a wireless communication protocol such as Wi-Fi, Bluetooth classic, or Bluetooth low energy. As described herein, payment reader 22 may communicate with an interactive electronic device such as a merchant device 29 via the wireless communication interface 108, provide an identifier and/or pairing information such as an encrypted passkey to the merchant device 29 (e.g., via the payload of a Bluetooth classic or Bluetooth low energy advertising message), undergo a pairing procedure in order to pair with the merchant device 29, and once the pairing is complete, engage in encrypted communications with the paired merchant device 29.

Wired interface 110 may include any suitable interface for wired communication with other devices or a communication network, such as USB, Lightning, FireWire, Ethernet, any other suitable wired communication interface, or any combination thereof. Although the present disclosure may generally describe pairing information as being provided to merchant device 29 via a wireless communication interface (e.g., via an advertising message sent in accordance with Bluetooth classic or Bluetooth low energy), in other embodiments the pairing information may be provided via the wired interface. For example, the wired communication interface 110 of payment reader 22 may be a USB, Lightning, or FireWire communication interface. The merchant device 29 may request the pairing information via the wired communication interface 110 and the payment reader may provide the pairing information via the same interface.

Memory 122 may include a plurality of sets of instructions for performing the processing operations of payment reader 22, such as operating instructions 130, transaction processing instructions 132, cryptographic instructions 134, and wireless communication instructions 136. Although not depicted in FIG. 3, in some embodiments sensitive information such as the cryptographic instructions 132, encryption keys, passwords, and other similar information may be stored in a logically and physically distinct memory from the other instructions and storage.

Operating instructions 130 may include instructions for controlling any suitable general operations of the payment reader 22, such as internal communications, power management, processing of messages, system monitoring, sleep modes, user interface response and control, and the management of the other sets of instructions. In one embodiment, the operating instructions 130 may provide the operating system and applications necessary to perform most of the processing operations that are performed by the processing unit 120 of the reader chip 100 of payment reader 22.

In addition, operating instructions 130 may include instructions for controlling the interaction between the payment reader 22 and a payment device 10 (e.g., for interfacing with a payment device via the NFC interface 102 and contact interface 104). In one embodiment, the operating instructions may include instructions for generating a wireless carrier signal, providing the wireless carrier signal to NFC interface 102 (e.g., via analog front end circuitry), modulating the wireless carrier signal based on data to be transmitted according to a communication protocol, receiving a modulated wireless carrier signal from the NFC interface 102 (e.g., via analog front end circuitry), demodulating the received modulated wireless carrier signal according to a communication protocol, and determining received data from the demodulated signal.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108, based on wireless instructions 136). The operating instructions 132 facilitate processing of this payment, for example, by acquiring payment information via the NFC interface 102 or contact interface 104, invoking the transaction processing instructions 132 and cryptographic instructions 134 to process that payment information, and by generating responsive messages that are transmitted to the point-of-sale application of the merchant device via wireless interface 108 based on wireless instructions 136.

Operating instructions 130 may also include instructions for interacting with a payment service system at a payment server 40. In one embodiment, a payment service system may be associated with the payment reader 22 and the point-of-sale application of the merchant device 29. For example, the payment service system may have information about payment readers 22 and merchant devices 29 that are registered with the payment service system (e.g., based on unique identifiers). In some embodiments, this information (e.g., a unique identifier of the payment reader 22) may be used to identify an encrypted key or pairing information for use in server-assisted pairing as described herein. This information may also be used to process transactions with servers of the merchant and customer financial institutions, for providing analysis and reports to a merchant, and aggregating transaction data. The payment reader 22 may process payment information (e.g., based on the transaction processing instructions 132 and the cryptographic instructions 134) and communicate that processed payment information to the point-of-sale application, which in turn communicates with the payment service system. In this manner, messages from the payment reader 22 may be forwarded to the payment service system of payment server 40, such that the payment reader 22 and payment service system may collectively process the payment transaction.

Transaction processing instructions 132 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions.

Cryptographic instructions 134 may include instructions for performing cryptographic operations. Processing unit 120 may execute the cryptographic instructions to perform a variety of cryptographic functions, such as to encrypt or decrypt payment and transaction information as part of a payment transaction. In one embodiment, the payment reader 22 may have one or more keys that are stored in memory 122 (e.g., in a logically and physically distinct portion of the memory 122) and that correspond to one or more keys that are stored at a pairing server (e.g., of a payment service system at a payment server 40). Although any suitable type of keys may be used in accordance with the present disclosure, in some embodiments the keys may include a public/private key pair or a shared private key. As will be described herein, the keys may also be used to encrypt pairing information such as a passkey that is used during the pairing of the payment reader 22 to an interactive electronic device such as merchant device 29. This encrypted passkey may be forwarded to the payment service system via the merchant device 29. The payment service system may function as a pairing server that facilitates pairing between the payment reader 22 and merchant device 29, as described herein.

Wireless communication instructions 136 may include instructions for communicating wirelessly with other devices such as an interactive electronic device (e.g., merchant device 29). Although wireless communication instructions 136 may be used for any suitable wireless communications interface 108, in one embodiment, the wireless communication interface 108 may be a Bluetooth interface (e.g., Bluetooth classic, Bluetooth low energy, or both) and the wireless communication instructions 136 may be for the operation of the Bluetooth interface. Processing unit 120 may execute the wireless communication instructions 136 to send and receive messages (e.g., in broadcast or connected modes) to communicate with the merchant device 29.

In one embodiment, the wireless communication instructions 136 may include instructions for performing server-assisted pairing with an interactive electronic device such as a merchant device 29. Payment reader 22 may have an established relationship with a pairing server (e.g., of a payment service system at a payment server 40), such that the payment reader 22 and the pairing server share information such as one or more shared keys or information relating to pairing information such as a passkey. The pairing between the payment reader 22 and the merchant device 29 may utilize a secure simple pairing procedure such as a passkey entry procedure. Such procedures may typically require the display of a passkey such as a 6 digit number at the payment reader 22 and entry of that passkey at the merchant device 29, such that a user of the payment reader 22 and the merchant device 29 are able to confirm the passkey visually.

In one embodiment, rather than providing for the display or entry of the passkey at the payment reader 22, the payment reader 22 passkey may be encrypted (e.g., based on processor 120 executing the cryptographic instructions 134) and the encrypted passkey may be transmitted to a wireless device (e.g., an interactive electronic device such as a merchant device 29). Although the encrypted passkey may be transmitted in any suitable manner, in embodiments the encrypted passkey may be broadcast as the payload of an advertising message, or transmitted during a Bluetooth pairing procedure. As is described herein, a point-of-sale application running on the merchant device 29 may also be associated with the pairing server (e.g., of a payment service system at a payment server 40) and may communicate the encrypted passkey to the pairing server over a communication network (e.g., the internet). The pairing server may use its own keys to determine whether the payment reader 22 is authorized to pair to the merchant device 29, and if so, decrypt the encrypted passkey with its own keys. This decrypted passkey may be transmitted to the merchant device 29 via a secured connection (e.g., a SSL or TLS connection, or as encrypted data based on keys of the merchant device and pairing server). The merchant device 29 may then utilize the decrypted passkey to complete the pairing process and establish a paired connection with payment reader 22, as described herein.

In another embodiment, rather than providing for the display or entry of the passkey at the payment reader 22, the payment reader 22 may transmit identifying information such as a unique identifier (either encrypted or as plaintext) to a wireless device (e.g., an interactive electronic device such as a merchant device 29). Although the identifying information may be transmitted in any suitable manner, in embodiments the identifying information may be broadcast as the payload of an advertising message, or transmitted during a Bluetooth pairing procedure. As is described herein, a point-of-sale application running on the merchant device 29 may also be associated with the pairing server (e.g., of a payment service system at a payment server 40) and may communicate the identifying information to the pairing server over a communication network (e.g., the internet). The pairing server may use the identifying information to look up pairing information such as a passkey. This retrieved passkey may be transmitted to the merchant device 29 via a secured connection (e.g., a SSL or TLS connection, or as encrypted data based on keys of the merchant device and pairing server). The merchant device 29 may then utilize the retrieved passkey to complete the pairing process and establish a paired connection with payment reader 22, as described herein.

Figure 4:
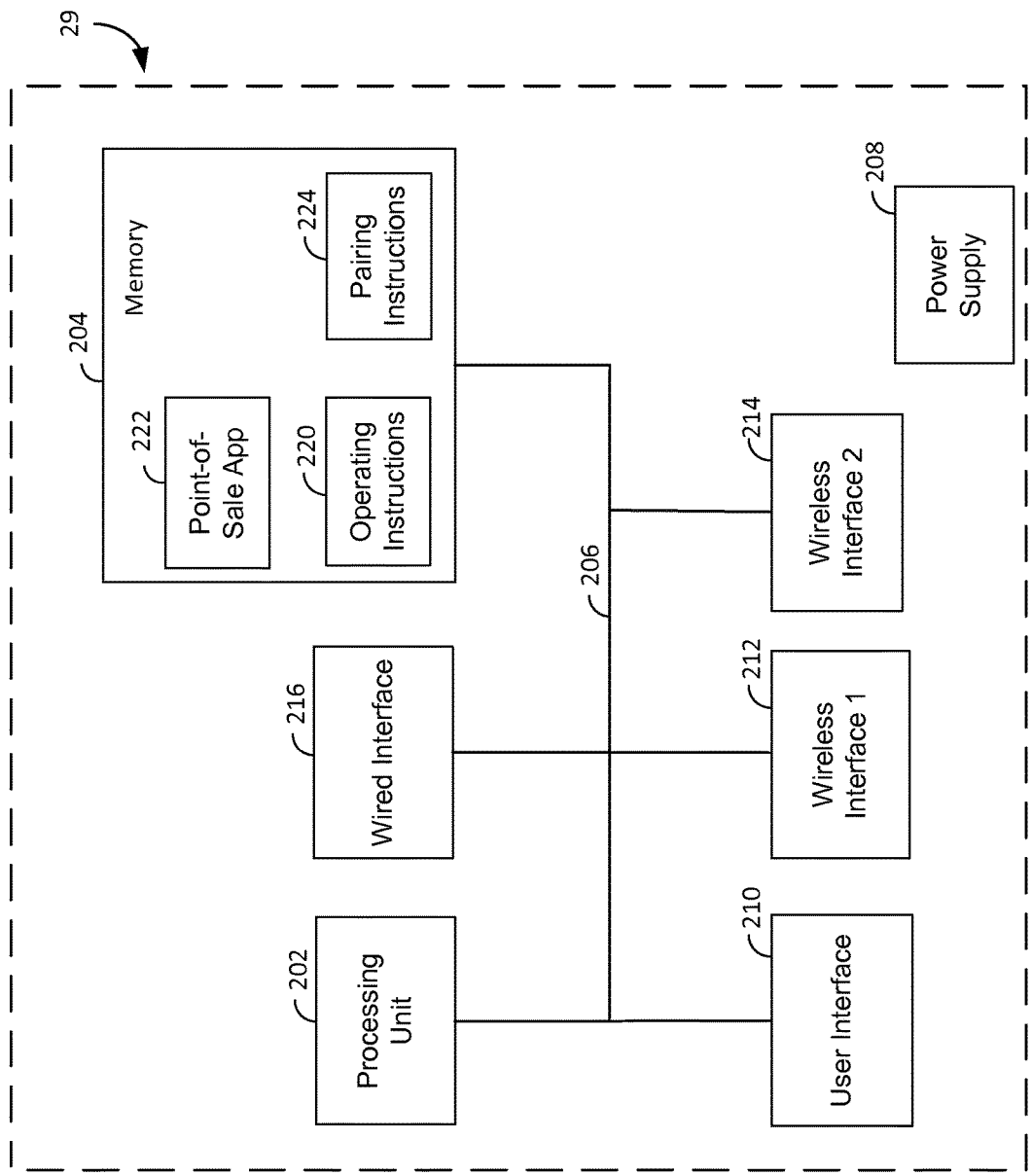
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 of may be a general purpose processor running instructions for a mobile operating system, programs, and applications based on instructions that may be stored in memory 204. The memory may include any suitable memory types or combination thereof as described herein, such as flash memory and RAM memory, for storing instructions and other data and providing a working memory for the execution of the operating system, programs, and applications of the merchant device 29. In one embodiment, the memory may include a plurality of sets of instructions, such as operating instructions 220, point-of-sale application instructions 222, and pairing instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse gesture recognition, any other suitable user interface, or any combination thereof. In one embodiment, the user interface 210 may be a touchscreen interface that displays an interactive user interface for programs and applications such as a point-of-sale application running on the merchant device 29, and prompts and displays for pairing (e.g., Bluetooth classic and/or Bluetooth low energy pairing) with a payment reader 22.

In one embodiment, a point-of-sale application running on the merchant device 29 may display a selectable option on user interface 210 (e.g., a menu option, connection button, or other display item) to find a payment reader 22 within range of the merchant device 29. In response to the selection, the user interface may provide a listing of available payment readers that may be selected (e.g., based on identifying information provided in an advertising message), and once selected, the merchant device 29 may access pairing information (e.g., an encrypted passkey and/or unique identifier) and communicate with a pairing server (e.g., payment service system of payment server 40) in order to acquire the pairing information. This pairing information may be utilized to complete a pairing procedure (e.g., Bluetooth classic and/or Bluetooth low energy pairing) between the merchant device 29 and payment reader 22 on the first wireless interface 212. In one embodiment, the pairing information (e.g., the passkey) may be displayed to the user so that the user can enter the pairing information in accordance with the pairing procedure.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. A first wireless communication interface 212 may be a wireless communication interface that primarily communicates with payment reader 22 (e.g., a Bluetooth classic and/or Bluetooth low energy interface) while a second wireless communication interface 214 may be a wireless communication interface (e.g., WiFi) that primarily communicates with a payment service system of payment server 40 (e.g., via the internet).

Merchant device may also include a wired interface 216, which may include any suitable interface for wired communication with other devices or a communication network, such as USB, Lightning, FireWire, Ethernet, any other suitable wired communication interface, or any combination thereof. Although the present disclosure may generally describe encrypted pairing information as being provided to merchant device 29 via first wireless communication interface 212 (e.g., via an advertising message sent in accordance with Bluetooth classic or Bluetooth low energy), in other embodiments the encrypted pairing information (e.g., a passkey) may be provided via the wired interface. For example, in response to a selection of a payment reader 22 from a user via user interface 210, the processing unit 202 may request the encrypted pairing information from the payment reader via the wired interface 216.

Memory 204 may include a plurality of sets of instructions for performing the processing operations of merchant device 29, such as operating instructions 220, point-of-sale application instructions 222, pairing instructions 224, and any other suitable instructions for operating the merchant device 29 (e.g., instructions related to the operation of one or more other applications or components of the merchant device 29).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface may be controlled in accordance with the instructions of programs and applications of the operating instructions 220, point-of-sale application instructions 222, and the pairing instructions 224. In one embodiment, the point-of-sale application instructions 222 may include instructions to display a menu or other selection option in order to pair with a payment reader 22. The user interface 210 may display the menu or other selection option based on the operating instructions 220 executed by processing unit 202. The pairing instructions 224 may include instructions for the display of the decrypted pairing information to the user and a location to enter the decrypted pairing information via user interface 210, which may be provided based on the operating instructions 220 executed by the processing unit 202.

Operating instructions 220 may also include instructions for interacting with a payment reader 22. In one embodiment, in response to the selection of a particular reader via the user interface 210, and a request by the pairing instructions 224 to obtain the pairing information, the processing unit 202 may execute instructions of the operating instructions 220 in order to communicate with the payment reader 22 and receive the pairing information. In one embodiment, operating instructions 220 running on processing unit 202 may cause first wireless communication interface 212 to monitor transmissions (e.g., Bluetooth classic or Bluetooth low energy advertising messages) and acquire payload data from those messages that may be processed in accordance with the pairing instructions 224. This payload data may include information such as a unique identifier for the payment reader 22 and/or encrypted pairing information.

Operating instructions 220 may include instructions for interacting with a payment service system at a payment server 40. The payment reader 22 and/or the application running on the merchant device 29 may be known (e.g., via a registration process) to the payment service system, such that the merchant device 29 may process payments with the payment service system according to the point-of-sale application instructions. In addition, in response to the processing unit 202 executing the pairing instructions 224, the payment reader 22 may be in communication with the payment service system which may decrypt or retrieve pairing information based on encrypted pairing information or identifying information received from payment reader 22. Operating instructions may provide for secure communications of this information (e.g., using TLS, SSL, or data encrypted by keys of the merchant device and pairing server) with the payment service system, e.g., via a WiFi connection of the second wireless communication interface 214 or an Ethernet connection of the wired interface 216.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations.

As described herein, the point-of-sale application instructions 222 also provide instructions for selecting a payment reader 22 that can receive payment information from a payment device such as a NFC device 12 or a chip card 14. In one embodiment, the point-of-sale application instructions 222 provide instructions for the processing unit 202 to operate the first wireless communication interface 212 (or in some embodiments, a wired interface 216) to receive advertising messages from transmitting devices. In one embodiment, the advertising messages may include an identifier within the message payload that may identify the device as a payment reader or that may provide a unique identifier for the payment reader. The merchant device may distinguish the payment reader 22 from other transmitted devices based on this identifier (e.g., in some embodiments, the merchant device may communicate the identifier to the payment service system to determine which transmitting devices are payment readers 22). A display (e.g., a menu listing) of the available payment readers 22 may be provided via the user interface 210 and a user may select a payment reader 22 for pairing.

Pairing instructions 224 include instructions for pairing the merchant device 29 with the payment reader 22. When executed by the processing unit 202, the pairing instructions 224 acquire the information provided by the payment reader 22. In one embodiment, processing unit 202 executes operating instructions 220 to receive an advertising message from the selected payment reader 22. The encrypted pairing information and/or identifier is extracted from the message in accordance with the pairing instructions 224 and transmitted to the payment service system via second wireless interface 214 (e.g., via WiFi) or wired interface 216 (e.g., via Ethernet). Processing unit 202 executes operating instructions 220 to receive a secure responsive message including the decrypted or retrieved pairing information (i.e., received pairing information) from the payment service system via second wireless interface 214 or wired interface 216.

In one embodiment, pairing instructions 224 may include instructions for displaying the received pairing information (e.g., a 6-digit passkey) at a display of user interface 210, and providing a location for the user to input the received pairing information as a pairing input to a pairing procedure such that the pairing process can be completed. In other embodiments, the pairing instructions 224 may include instructions for automatically providing the received pairing information to the pairing procedure. Once the received pairing information is provided to the pairing procedure, security information such as keys and unique codes may be generated by the payment reader 22 and the merchant device 29 such that the two devices can engage in secure wireless communications via the wireless communication interface 108 of payment reader 22 and the first wireless communication interface 212 of the merchant device 29.

Figure 5:
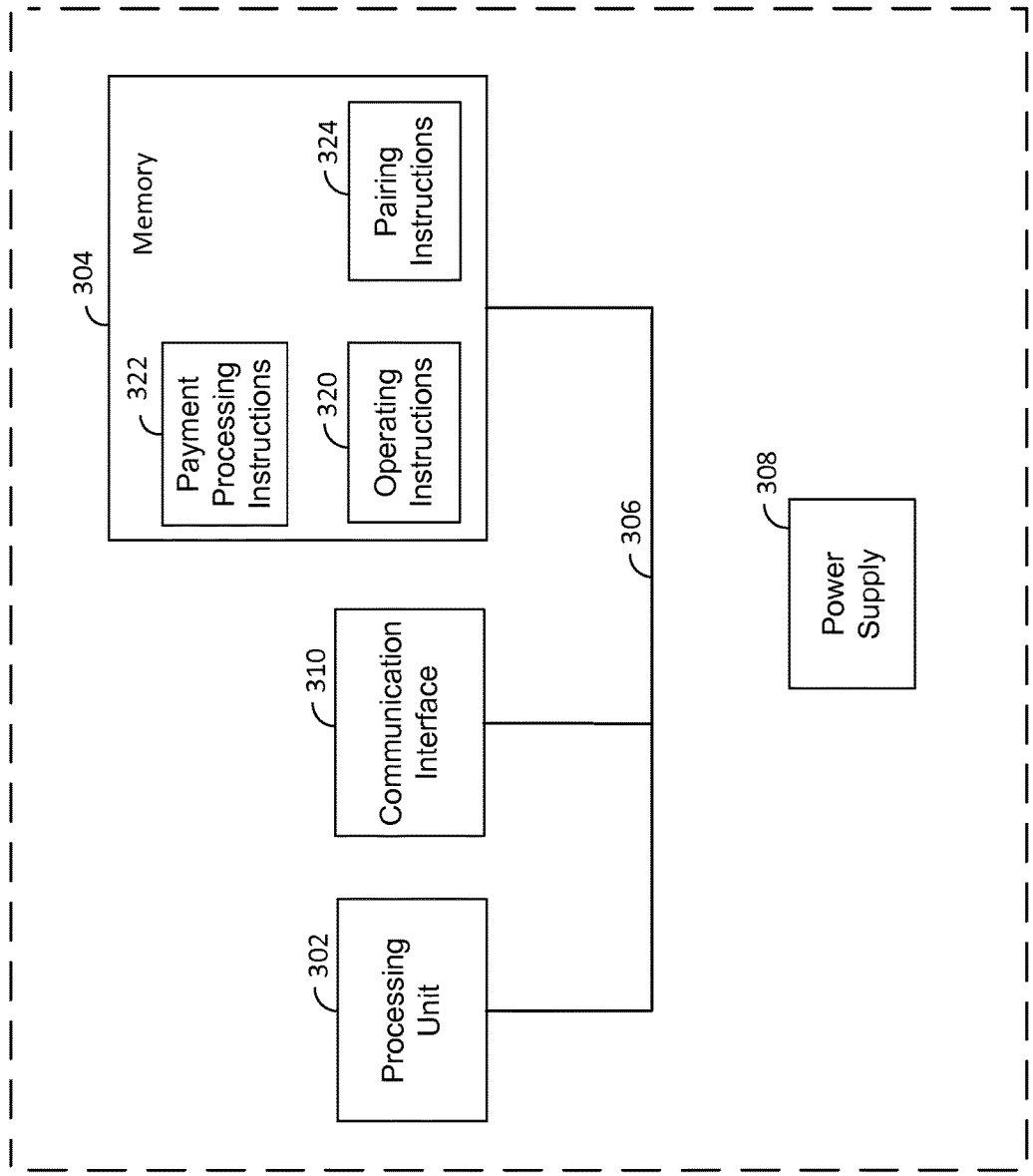
FIG. 5 depicts an illustrative block diagram of a payment service system in accordance with some embodiments of the present disclosure.

FIG. 5 depicts an exemplary payment service system of a payment server 40 in accordance with some embodiments of the present disclosure. Although the payment service system is depicted as a single server, it will be understood that the operations and memory of the payment service system may be distributed over any suitable number of servers. Although particular components are depicted in a particular arrangement in FIG. 5, it will be understood that the payment service system may include additional components, one or more of the components depicted in FIG. 5 may not be included in the payment service system, and the components of payment service system may be rearranged in any suitable manner. In one embodiment, payment service system includes at least a processing unit 302, a memory 304, an interface bus 306, a power supply 308, and a communication interface 310.

In one embodiment, the payment service system includes a processing unit 302 and memory 304 that are configured to control and perform the necessary operations of the payment service system. In one embodiment, the processing unit 302 of may be a high-speed purpose processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system. In one embodiment, the memory may include a plurality of sets of instructions, including but not limited to operating instructions 320, payment processing instructions 322, and pairing instructions 324.

The processing unit 302 may execute the instructions of memory 304 to interact with and control one or more other components of the payment service system. Although the processing unit 302 may communicate with other components of the payment service system in any suitable manner, in one embodiment the processing unit 302 may utilize an interface bus 306. Interface bus 306 may include one or more communication buses such as I²C, SPI, USB, UART, and GPIO. In one embodiment, the processing unit 302 may execute instructions of the memory 304 and based on those instructions may communicate with the other components of the payment service system via the communication buses of interface bus 306.

The payment service system may also include a power supply 308. Power supply 308 may include power conversion circuitry for converting AC power and/or generating a plurality of DC voltages for use by components of the payment service system. In some embodiments, power supply 308 may include a backup system such as a battery backup, to avoid interruptions in service during power outages. Although not depicted as physically connected to the other components of the payment service system in FIG. 5, power supply 308 may supply a variety of voltages to the components of the payment service system in accordance with the requirements of those components.

The payment service system may also include a communication interface 310. Although communication interface 310 may include any suitable communication interface or combination thereof, in some embodiments the communication interface 310 may utilize higher speed communication interfaces such as WiFi, cellular, Ethernet, or fiber optics. As is described herein, the communication interface may establish a secured connection (e.g., via TLS, SSL, or as data encrypted based on keys of the merchant device and pairing server) with a merchant device 29 in order to process payment transactions and assist in pairing with a payment reader 22. The communication interface may also communicate with other servers of the payment server 40 such as transaction processing servers, which may, in some embodiments, be located remotely from the payment service systems and operated by different entities than those that control the payment service system. For example, in one embodiment, the payment service system may be operated by an entity that provides one or more of the payment reader 22, merchant device 29, or point-of-sale application. Transaction processing servers may be associated with and operated by one or more of the merchant, issuer, or customer banks.

Memory 304 may include a plurality of sets of instructions for performing the processing operations of the payment service system, such as operating instructions 320, payment instructions 322, pairing instructions 324, and any other suitable instructions for operating the payment service system (e.g., instructions related to the operation of one or more other applications or components of the payment service system).

Operating instructions 320 may include instructions for controlling any suitable general operations of the payment service system, such as internal communications, power management, control of communication devices, control of other hardware of the payment service system, any other suitable instructions, or any combination thereof. In one embodiment, the operating instructions may provide instructions for the operating system of the payment service system as well as most drivers, programs, and applications operating on the payment service system.

Operating instructions 320 may also include instructions for interacting with a merchant device 29. In one embodiment, the payment service system may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or transaction processing servers. In one embodiment, the payment processing instructions may include information about each payment reader 22 and merchant device 29 having an installed point-of-sale application. In addition to performing payment processing functions such as providing payment information such as amount and a credit card number to a transaction processing system and communicating responses back to the merchant, the payment service system may also perform complex analysis of merchant data that may be used to provide reports, metrics, or other data to a merchant (e.g., a merchant operating a plurality of merchant devices 29 at a plurality of locations). Payment processing instructions 332 may also include instructions for accessing encryption keys such as a shared private key or a key of a public/private key pair for encrypting and decrypting data provided by one or more of a payment device 10, payment reader 22, or merchant device 29.

Pairing instructions 324 include instructions to assist with the pairing a merchant device 29 with a payment reader 22. As described herein, in some embodiments the payment reader 22 may encrypt pairing information such as a passkey (e.g., a 6-digit passkey) and/or provide an identifier that is transmitted to the merchant device 29 (e.g., in an advertising message) and from the merchant device to the payment service system. Pairing instructions 324 may include instructions for decrypting the encrypted pairing information or accessing pairing information such as a passkey based on the identifier. In one embodiment, the payment reader 22 and the payment service system may have a shared key such as a shared secret key that was stored at payment reader 22 during manufacturing or via a secure key injection procedure. In some embodiments, the payment reader 22 and payment service system may have shared pairing information such as a passkey. This information (e.g., shared secret keys, passkeys, identifiers, etc.) may be stored in a data structure such as a database of the payment service system. Based on the pairing instructions 324, the processing unit 302 may access the shared secret key or passkey associated with the particular payment reader 22 (e.g., based on the identifier, information associated with encrypted pairing information, or in any other suitable manner) and attempt to decrypt the encrypted pairing information or retrieve pairing information. If the decryption or retrieval is successful, the decrypted pairing information may be transmitted to the merchant device 29 via a secure connection, as described herein. If the decryption is not successful, the payment service system may send an error message to the merchant device 29.

Figure 6:
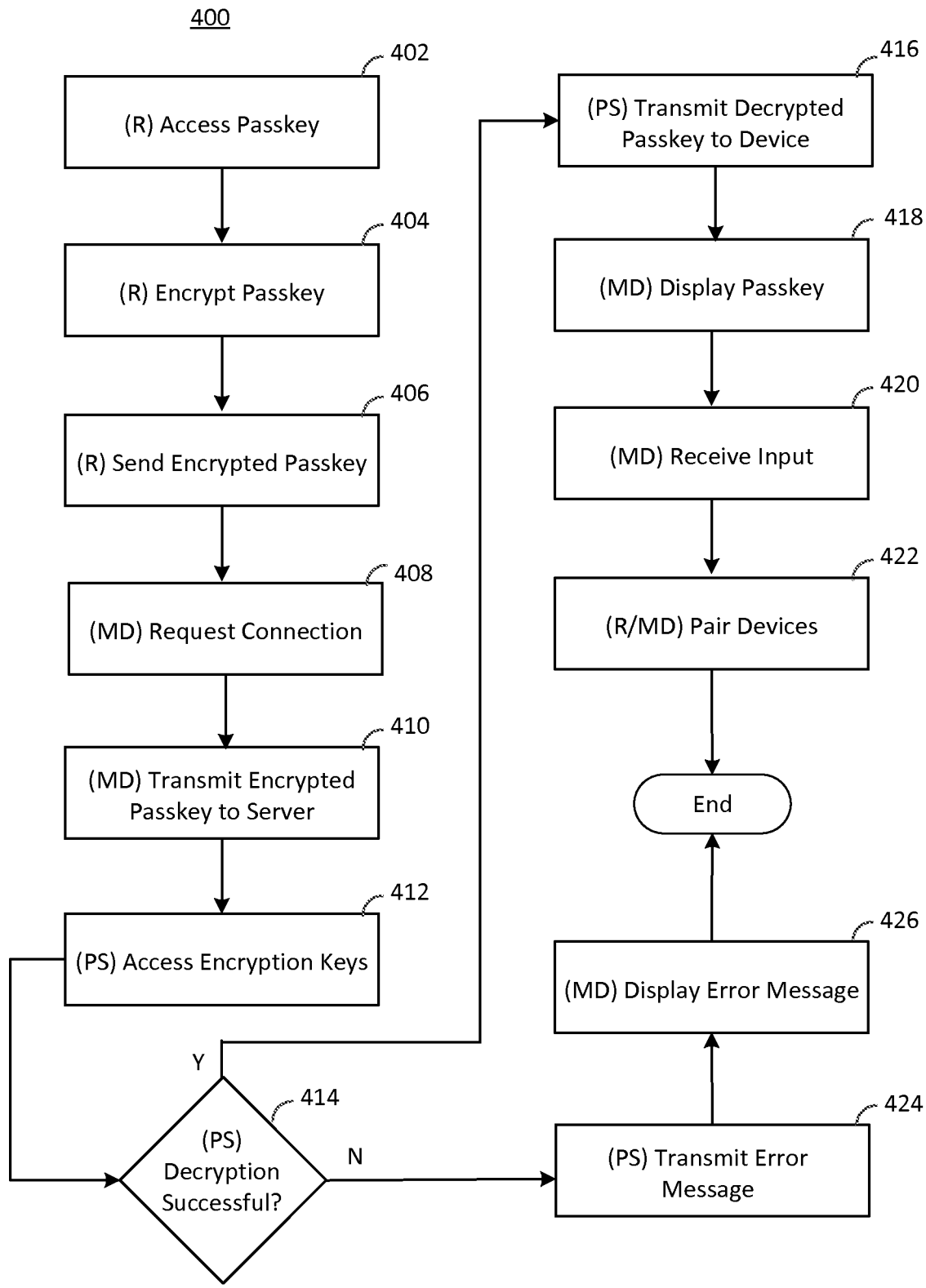
FIG. 6 depicts a non-limiting flow diagram illustrating exemplary methods for server-assisted pairing to provide a decrypted passkey in accordance with some embodiments of the present disclosure.
Figure 7:
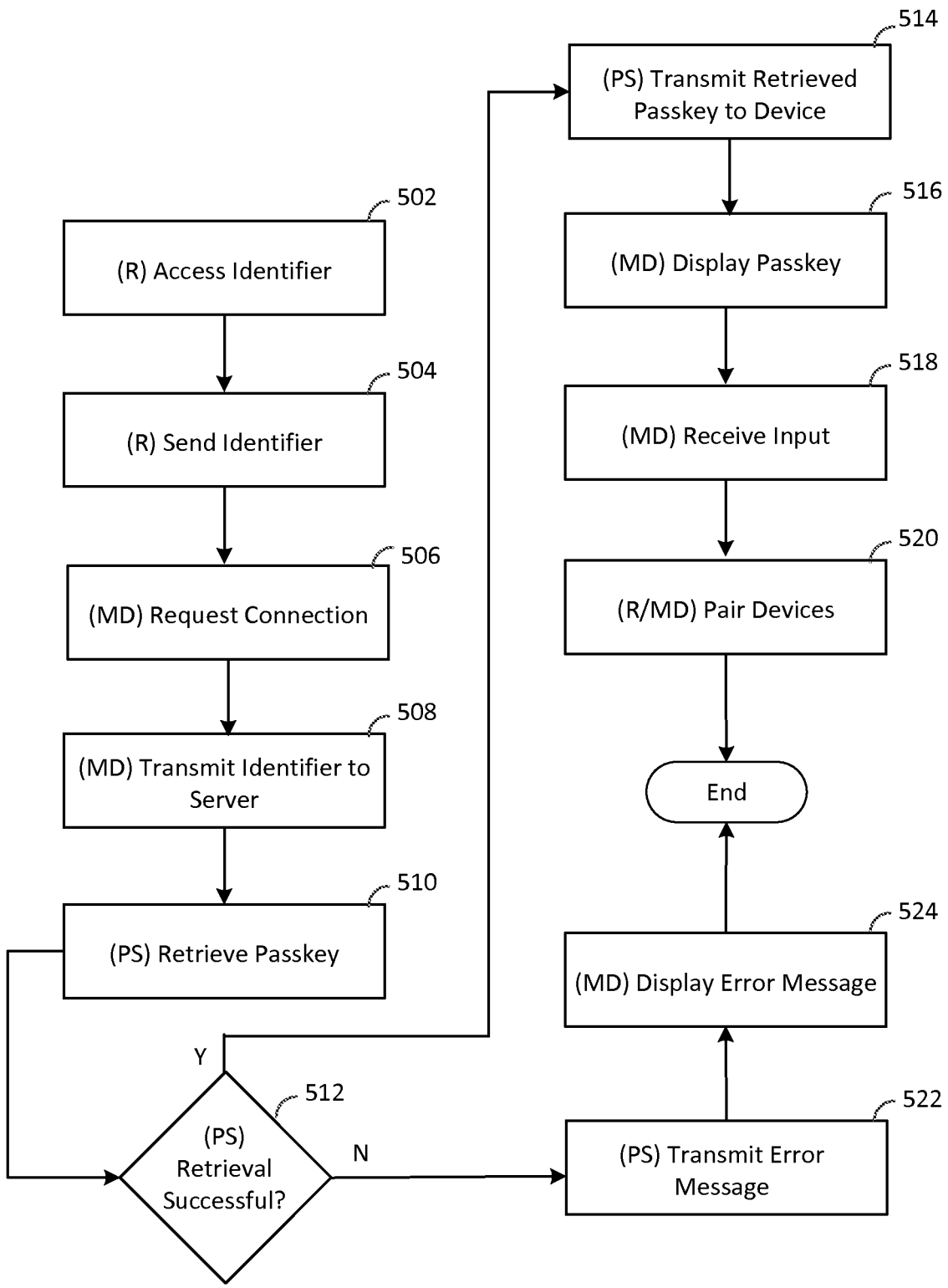
FIG. 7 depicts a non-limiting flow diagram illustrating exemplary methods for server-assisted pairing to provide a retrieved passkey in accordance with some embodiments of the present disclosure.

In view of the structures and devices described supra, methods that can be implemented in accordance with the disclosed subject matter will be better appreciated with reference to the flowcharts of FIGS. 6-7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts steps 400 for performing server-assisted pairing in accordance with some embodiments of the present disclosure. In one embodiment as is depicted in FIG. 6, steps 400 are performed by a wireless device such as a payment reader 22 (indicated with an (R) in FIG. 6), an interactive electronic device such as a merchant device 29 (indicated with and (MD) in FIG. 6), and a pairing server such as a payment service system of a payment server 40 (indicated with a (PS) in FIG. 6). Although these steps are described as being performed by particular devices in one embodiment, it will be understood that the allocation of the steps between the devices may be modified in any suitable manner or that the number of devices performing the steps may be modified in any suitable manner.

At step 402, processing unit 120 of payment reader 22 may access pairing information such as a passkey based on the wireless instructions 136. Although any suitable pairing information or passkey may be accessed for any suitable wireless communication method in accordance with the present disclosure, in one embodiment, the passkey may be a 6-digit passkey. This 6-digit passkey may be used for a numeric passkey entry secure simple pairing (SSP) procedure applicable to Bluetooth classic and Bluetooth low energy pairing. Once the pairing information is accessed at step 402, processing may continue to step 404.

At step 404, processing unit 120 of payment reader 22 may encrypt the pairing information (e.g., the 6-digit passkey) using an encryption key based on the cryptographic instructions 134. Although any suitable type of encryption key and encryption procedure may be used in accordance with the present disclosure, in one embodiment, the payment reader 22 may have stored in memory a secret key that is shared with the payment service system. Once the pairing information is encrypted, processing may continue to step 406.

At step 406, processing unit 120 of payment reader 22 may transmit the encrypted pairing information to the merchant device 29 via wireless interface 108 based on the wireless instructions 136. The encrypted pairing information may be transmitted in any suitable manner, for example, as a payload of an advertising message sent pursuant to a Bluetooth classic or Bluetooth low energy wireless protocol. Even though the message may not be encrypted, because the payload of the encrypted pairing information can only be decrypted by a party having the appropriate key (e.g., a secret key shared by the payment service system) it is not possible for unauthorized third parties to access the pairing information. In other embodiments, the encrypted pairing information may be sent as part of a different message or pursuant to other wireless protocols. In one such embodiment, the encrypted pairing information may be sent after initiation of a pairing procedure (e.g., as the payload of a message sent once the pairing process is initiated). In another such embodiment, the encrypted pairing information may be sent as the payload of a response message after reception of a request message provided by the merchant device 29. The request message may provide information in the message payload such as a message code known to the point-of-sale application and payment reader 22, which indicates that the encrypted pairing information should be transmitted to the merchant device 29. Once the encrypted pairing information has been transmitted, processing may continue to step 408.

At step 408, processing unit 202 of merchant device 29 may respond to the advertising message by requesting a connection via the first wireless interface 212 and based on the operating instructions 220. As described herein, the request to initiate the connection may be based on an input provided to user interface 210 based on the point-of-sale application instructions 222. Although any suitable connection request may be sent to the payment reader 22, in the exemplary embodiment of the Bluetooth classic or Bluetooth low energy wireless protocol, the connection request may be for a simple secure pairing procedure such as a passkey entry procedure. In some embodiments, the request may be for the payment reader 22 to function as the initiator of the connection, for example, based on a known message type for the payment reader 22 and point-of-sale application.

Whichever device functions as the initiator and whatever pairing procedures are used, the devices may begin exchanging messages necessary for pairing. Eventually, the merchant device 29 may require pairing information such as a passkey to be provided to complete the pairing process. As described herein, this pairing information may be provided to the merchant device 29 via communications with a pairing server such as the payment service system, rather than displaying the pairing information at the payment reader. Once a connection has been requested and the pairing process has begun, processing may continue to step 410.

At step 410, processing unit 202 of merchant device 29 may transmit the encrypted pairing information, a request to decrypt the pairing information, and other related information (e.g., an identifier of the payment reader) to a pairing server such as the payment service system via a communication interface such as the second wireless interface 214 (e.g., a WiFi interface) or the wired interface 216 (e.g., via an Ethernet interface) based on the operating instructions 220 and pairing instructions 224. As described herein, the point-of-sale application running on the merchant device 29 may be associated with the payment service system such that the payment service system and merchant device 29 may communicate via a secure connection (e.g., TLS, SSL, or as data encrypted based on keys of the merchant device and payment service system). The merchant device 29 may also transmit identifying information of the point-of-sale application such that the payment service system may verify and/or authenticate the point-of-sale application running on the merchant device 29. Once the encrypted pairing information has been transmitted to the payment service system, processing may continue to step 412.

At step 412, processing unit 302 of a pairing server such as the payment service system may access one or more keys based on the request to decrypt the pairing information and the pairing instructions 324. As described herein, the payment service system may have one or more keys stored in memory that correspond to one or more keys of the payment reader 22. In one embodiment, the one or more keys may be a shared secret key of the payment service system and the payment reader 22, and the payment service system may access the shared key (e.g., based on an identifier of the payment reader 22). Once the key is accessed at step 412, processing may continue to step 414.

At step 414, processing unit 302 of a pairing server such as the payment service system may determine whether the decryption of the encrypted pairing information was successful based on pairing instructions 324. The decryption may be successful if the payment service system was able to identify the shared key for the payment reader 22 that encrypted the pairing information. In some embodiments, the payment service system may also analyze the identifying information of the point-of-sale application. Although identifying information may be analyzed for any suitable purpose, in one embodiment the analysis may determine whether the merchant device running the point-of-sale application is authorized to pair to the payment reader 22. If the point-of-sale application is not authorized, the payment service system may not decrypt the encrypted pairing information. If the decryption was successful, processing may continue to step 416. If the decryption was not successful, processing may continue to step 424.

At step 416, processing unit 302 of a pairing server such as the payment service system may transmit the decrypted pairing information to the merchant device 29 via communication interface 310 based on operating instructions 320 and pairing instructions 324. As described herein, the point-of-sale application running on the merchant device 29 may be associated with the payment service system such that the payment service system and merchant device 29 may communicate via a secure connection (e.g., TLS or SSL, or as encrypted data based on keys of the merchant device and pairing server). The decrypted pairing information will thus be protected from third parties during the transmission to the merchant device 29. Processing may then continue to step 418.

At step 418, processing unit 202 of merchant device 29 may display the decrypted pairing information (e.g., a 6-digit passkey for Bluetooth classic or Bluetooth low energy) at user interface 210 based on the point-of-sale application instructions 222 and the pairing instructions 224. Although the decrypted pairing information may be displayed in any suitable manner, in one embodiment the point-of-sale application may display the decrypted pairing information along with instructions for how to complete the pairing process. In one embodiment, the instructions can explain that the pairing information must be entered into an interface for the wireless communication protocol in order to complete pairing with the payment reader 22. Processing may then continue to step 420.

At step 420, processing unit 202 of merchant device 29 may provide a display for receiving a user entry of the decrypted pairing information (e.g., a 6-digit passkey for Bluetooth classic or Bluetooth low energy) at user interface 210 based on the operating instructions 220, the point-of-sale application instructions 222 and the pairing instructions 224. Although the display may be provided in any suitable manner, in one embodiment a data entry interface for the wireless communication protocol may be provided on the same screen as the displayed decrypted pairing information, along with a prompt for the user to enter the decrypted pairing information in the data entry interface. Once the user has completed entering the decrypted pairing information or the decrypted pairing information has been automatically provided, processing may continue to step 422.

Although not depicted in FIG. 6, in another embodiment it may not be necessary to display the pairing information (at step 418) or for the user to enter the decrypted pairing information at the user interface 210 (at step 420). Instead, the decrypted pairing information may be provided to the pairing program automatically as if it were entered by the user. Based on the intermediary operations of a pairing server such as the payment service system, this automatic method of providing the pairing information may result in secure pairing of the payment reader 22 to the merchant device 29. Once the decrypted pairing information has been provided to the pairing program, processing may continue to step 422.

At step 422, the payment reader 22 and merchant device may complete the pairing procedure according to a pairing protocol such as the Bluetooth SSP passkey entry procedure, based on the pairing information from the payment reader 22 and the same (decrypted) pairing information at merchant device 29. Once this is completed, the processing steps 400 of FIG. 6 may then end.

If decryption is not successful at step 414, processing continues on the path to step 424. At step 424, processing unit 302 of a pairing server such as the payment service system may transmit an error message to the merchant device 29 via communication interface 310 based on operating instructions 320 and pairing instructions 324. As described herein, processing unit 302 may determine that the decryption was not successful. If the decryption was not successful, the error message may be transmitted to the merchant device 29. In some embodiments, the error message may include an error code or other information indicating the source of the error message. Processing may then continue to step 426.

At step 426, processing unit 202 of merchant device 29 may display the error message or a message based on the error message at user interface 210 based on the operating instructions 220, point-of-sale application instructions 222, and the pairing instructions 224. Although the error message may be displayed in any suitable manner, in one embodiment the point-of-sale application may display a message indicating that the pairing with the payment reader 22 was not successful. In some embodiments, the error message may also include a description of the error or suggestions for possible corrective action. Once the error message has been displayed at step 426, processing may end.

FIG. 7 depicts a non-limiting flow diagram illustrating exemplary steps 500 for server-assisted pairing to provide a retrieved passkey in accordance with some embodiments of the present disclosure. In one embodiment as is depicted in FIG. 7, steps 500 are performed by a wireless device such as a payment reader 22 (indicated with an (R) in FIG. 7), an interactive electronic device such as a merchant device 29 (indicated with and (MD) in FIG. 7), and a pairing server such as a payment service system of a payment server 40 (indicated with a (PS) in FIG. 7). Although these steps are described as being performed by particular devices in this one embodiment, it will be understood that the allocation of the steps between the devices may be modified in any suitable manner or that the number of devices performing the steps may be modified in any suitable manner.

At step 502, processing unit 120 of payment reader 22 may access an identifier for the payment reader 22 based on the wireless instructions 136. Although an identifier may be any information for the payment reader 22, in one embodiment, the identifier may be a unique identifier (e.g., a serial number or alphanumeric name) for the payment reader 22. As described herein, the payment reader 22 may be known to a payment service system, and may have a unique identifier that is associated with the payment reader 22 at the payment service system. Another exemplary identifier may be an encryption key that is unique to the payment reader, such as a shared secret key. Because the encryption key is unique to the payment reader 22, a payment service system may be able to confirm the identity of the payment reader 22 if it can decrypt a message encrypted with that key (e.g., with the shared secret key or a public key of public/private key pair). Once the identifier is accessed at step 502, processing may continue to step 504.

At step 504, processing unit 120 of payment reader 22 may transmit the identifier to the merchant device 29 via wireless interface 108 based on the wireless instructions 136. The identifier may be transmitted in any suitable manner, for example, as a payload of an advertising message sent pursuant to a Bluetooth classic or Bluetooth low energy wireless protocol. In other embodiments, the identifier may be sent as part of a different message or pursuant to other wireless protocols. In one such embodiment, the identifier may be sent after initiation of a pairing procedure (e.g., as the payload of a message sent once the pairing process is initiated). In another such embodiment, the identifier may be sent as the payload of a response message after reception of a request message provided by the merchant device 29. The request message may provide information in the message payload such as a message code known to the point-of-sale application and payment reader 22, which indicates that the identifier should be transmitted to the merchant device 29. Once the identifier has been transmitted, processing may continue to step 506.

At step 506, processing unit 202 of merchant device 29 may respond to the advertising message by requesting a connection via the first wireless interface 212 and based on the operating instructions 220. As described herein, the request to initiate the connection may be based on an input provided to user interface 210 based on the point-of-sale application instructions 222. Although any suitable connection request may be sent to the payment reader 22, in the exemplary embodiment of the Bluetooth classic or Bluetooth low energy wireless protocol, the connection request may be for a simple secure pairing procedure such as a passkey entry procedure. In some embodiments, the request may be for the payment reader 22 to function as the initiator of the connection, for example, based on a known message type for the payment reader 22 and point-of-sale application. Whichever device functions as the initiator and whatever pairing procedures are used, the devices may begin exchanging message necessary for pairing. Eventually, the merchant device 29 may require pairing information such as a passkey to be provided to complete the pairing process. As described herein, this pairing information may be provided to the merchant device 29 via communications with a pairing server such as the payment service system, rather than displaying the pairing information at the payment reader 22. Once a connection has been requested and the pairing process has begun, processing may continue to step 508.

At step 508, processing unit 202 of merchant device 29 may transmit the identifier (e.g., a unique identifier, a message encrypted with a secret key, and/or other identifiers) and a request to retrieve pairing information such as a passkey to a pairing server such as the payment service system via a communication interface such as the second wireless interface 214 (e.g., a WiFi interface) or the wired interface 216 (e.g., via an Ethernet interface) based on the operating instructions 220 and pairing instructions 224. As described herein, the point-of-sale application running on the merchant device 29 may be associated with the payment service system such that the payment service system and merchant device 29 may communicate via a secure connection (e.g., TLS, SSL, or as data encrypted based on keys of the merchant device and payment service system). The merchant device 29 may also transmit identifying information of the point-of-sale application such that the payment service system may verify and/or authenticate the point-of-sale application running on the merchant device 29. Once the identifier has been transmitted to the payment service system, processing may continue to step 510.

At step 510, processing unit 302 of a pairing server such as the payment service system may retrieve pairing information such as a passkey based on request to retrieve the pairing information, the identifier, and the pairing instructions 324. The payment service system may have passkeys stored in memory that are associated with the identifiers of the payment readers 22. For example, one or more passkeys may be associated with a unique identifier for a payment reader 22 and/or a secret key for the payment reader 22. In one embodiment, the payment service system may access the identifier, and based on the identifier, retrieve the passkey for the payment reader 22. Once the passkey is retrieval has been attempted at step 510, processing may continue to step 512.

At step 512, processing unit 302 of a pairing server such as the payment service system may determine whether the retrieval of the pairing information (e.g., the passkey) was successful based on pairing instructions 324. The retrieval may be successful if the payment service system was able to find the passkey for the payment reader 22 based on the identifier. In some embodiments, the payment service system may also analyze the identifying information of the point-of-sale application. Although identifying information may be analyzed for any suitable purpose, in one embodiment the analysis may determine whether the merchant device running the point-of-sale application is authorized to pair to the payment reader 22. If the point-of-sale application is not authorized, the payment service system may not retrieve the passkey. If the retrieval was successful, processing may continue to step 514. If the retrieval was not successful, processing may continue to step 522.

At step 514, processing unit 302 of a pairing server such as the payment service system may transmit the retrieved pairing information to the merchant device 29 via communication interface 310 based on operating instructions 320 and pairing instructions 324. As described herein, the point-of-sale application running on the merchant device 29 may be associated with the payment service system such that the payment service system and merchant device 29 may communicate via a secure connection (e.g., TLS, SSL, or as encrypted data based on keys of the merchant device and pairing server). The retrieved pairing information will thus be protected from third parties during the transmission to the merchant device 29. Processing may then continue to step 516.

At step 516, processing unit 202 of merchant device 29 may display the retrieved pairing information (e.g., a 6-digit passkey for Bluetooth classic or Bluetooth low energy) at user interface 210 based on the point-of-sale application instructions 222 and the pairing instructions 224. Although the retrieved pairing information may be displayed in any suitable manner, in one embodiment the point-of-sale application may display the retrieved pairing information along with instructions for how to complete the pairing process. In one embodiment, the instructions can explain that the pairing information must be entered into an interface for the wireless communication protocol in order to complete pairing with the payment reader 22. Processing may then continue to step 518.

At step 518, processing unit 202 of merchant device 29 may provide a display for receiving a user entry of the retrieved pairing information (e.g., a 6-digit passkey for Bluetooth classic or Bluetooth low energy) at user interface 210 based on the operating instructions 220, the point-of-sale application instructions 222 and the pairing instructions 224. Although the display may be provided in any suitable manner, in one embodiment a data entry interface for the wireless communication protocol may be provided on the same screen as the displayed retrieved pairing information, along with a prompt for the user to enter the retrieved pairing information in the data entry interface. Once the user has completed entering the retrieved pairing information, processing may continue to step 520.

Although not depicted in FIG. 7, in another embodiment it may not be necessary to display the pairing information (at step 516) or for the user to enter the retrieved pairing information at the user interface 210 (at step 518). Instead, the retrieved pairing information may be provided to the pairing program automatically as if it were entered by the user. Based on the intermediary operations of a pairing server such as the payment service system, this automatic method of providing the pairing information may result in secure pairing of the payment reader 22 to the merchant device 29. Once the retrieved pairing information has been provided to the pairing program, processing may continue to step 520.

At step 520, the payment reader 22 and merchant device 29 may complete the pairing procedure according to a pairing protocol such as the Bluetooth SSP passkey entry procedure, based on pairing of the payment reader 22 and the same (retrieved) pairing information at merchant device 29. Once this is completed, the processing steps 500 of FIG. 7 may then end.

If the passkey is not retrieved successfully at step 512, processing continues to step 522. At step 522, processing unit 302 of a pairing server such as the payment service system may transmit an error message to the merchant device 29 via communication interface 310 based on operating instructions 320 and pairing instructions 324. As described herein, processing unit 302 may determine that the retrieval was not successful. If the retrieval was not successful, the error message may be transmitted to the merchant device 29. In some embodiments, the error message may include an error code or other information indicating the source of the error message. Processing may then continue to step 524.

At step 524, processing unit 202 of merchant device 29 may display the error message or a message based on the error message at user interface 210 based on the operating instructions 220, point-of-sale application instructions 222, and the pairing instructions 224. Although the error message may be displayed in any suitable manner, in one embodiment the point-of-sale application may display a message indicating that the pairing with the payment reader 22 was not successful. In some embodiments, the error message may also include a description of the error or suggestions for possible corrective action. Once the error message has been displayed at step 524, processing may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for utilizing a pairing server to establish wireless pairing between a payment reader and a merchant device running a point-of-sale application, the method comprising:
   accessing a passkey at the payment reader;
   encrypting the passkey at the payment reader, wherein the encrypting is based on a first copy of a shared secret key;
   transmitting, from the payment reader, a broadcast communication containing the encrypted passkey;

receiving, at the point-of-sale application of the merchant device, a request to establish wireless pairing between the payment reader and the merchant device;

receiving, at the point-of-sale application of the merchant device, the broadcast communication containing the encrypted passkey;

transmitting, from the point-of-sale application of the merchant device to a pairing server, the encrypted passkey;

decrypting, at the pairing server, the encrypted passkey based on a second copy of the shared secret key;

transmitting, from the pairing server, the decrypted passkey to the point-of-sale application of the merchant device;

receiving, at the point-of-sale application of the merchant device, the decrypted passkey;

generating, by each of the payment reader and the merchant device, one or more encryption keys for pairing based on the passkey and the decrypted passkey; and establishing wireless pairing between the payment reader and the merchant device based on the one or more encryption keys for pairing, wherein after the wireless pairing is established the payment reader is configured to receive a request to process a payment from the point-of-sale application via the wireless pairing, to receive payment information from a payment device in response to the request, and to transmit the payment information to the point-of-sale application via the wireless pairing, and wherein the point-of-sale application is configured to complete a payment transaction based on the payment information.

2. The method of claim 1, wherein transmitting the broadcast communication containing the encrypted passkey from the payment reader to the point-of-sale application of the merchant device comprises:

generating an advertising message for a wireless communication protocol, wherein the payload of the advertising message comprises the encrypted passkey; and transmitting the advertising message.

3. The method of claim 1, wherein transmitting the broadcast communication containing the encrypted passkey from the payment reader to the point-of-sale application of the merchant device comprises:

transmitting an advertising message for a wireless communication protocol;

receiving a request message to establish a communication for the wireless communication protocol;

generating a response message for the wireless communication protocol, wherein the payload of the response message comprises the encrypted passkey; and transmitting the response message.

4. The method of claim 1, wherein establishing wireless pairing comprises:

displaying, at a user interface of the merchant device, the decrypted passkey;

receiving, at the user interface of the merchant device, a user pairing input; and establishing wireless pairing based on the user pairing input and the displayed decrypted passkey.

5. The method of claim 1, wherein receiving the request to establish wireless pairing between the payment reader and the merchant device comprises:

receiving, at a user interface of the merchant device, a user input selecting an option to pair with the payment reader; and providing, from the user interface, the user input to the point-of-sale application.

6. The method of claim 1, further comprising:

generating, at the point-of-sale application of the merchant device, a request to decrypt the encrypted passkey; and transmitting, from the point-of-sale application of the merchant device to the pairing server, the request to decrypt the encrypted passkey, wherein decrypting the encrypted passkey further comprises decrypting the encrypted passkey based on the request to decrypt the encrypted passkey.

7. A method for utilizing a pairing server to establish wireless pairing between a payment reader and a merchant device running a point-of-sale application, the method comprising:

accessing a passkey at the payment reader;

encrypting the passkey at the payment reader, wherein the encrypting is based on a first copy of a shared secret key;

transmitting, from the payment reader to the merchant device via a first communication channel, a request to establish wireless pairing between the payment reader and the merchant device via a second communication channel;

receiving, at the point-of-sale application of the merchant device, the request to establish wireless pairing between the payment reader and the merchant device;

transmitting, from the point-of-sale application of the merchant device to the payment reader via the first communication channel, a request for pairing information;

transmitting, from the payment reader, via the first communication channel, a broadcast communication containing the encrypted passkey;

receiving, at the point-of-sale application of the merchant device, the broadcast communication containing the encrypted passkey;

transmitting, from the point-of-sale application of the merchant device to a pairing server, the encrypted passkey;

decrypting, at the pairing server, the encrypted passkey based on a second copy of the shared secret key;

transmitting, from the pairing server, the decrypted passkey to the point-of-sale application of the merchant device;

receiving, at the point-of-sale application of the merchant device, the decrypted passkey; and establishing wireless pairing via the second communication channel between the payment reader and the merchant device based on the decrypted passkey, wherein the payment reader is configured to receive, after the wireless pairing via the second communication channel is established, a request to process a payment from the point-of-sale application via the second communication channel, to receive payment information from a payment device in response to the request to process the payment, and to transmit the payment information to the point-of-sale application via the second communication channel, and wherein the point-of-sale application is configured to complete a payment transaction based on the payment information.

* * * * *